Patented Aug. 11, 1942

2,292,913

UNITED STATES PATENT OFFICE 2,292,913

TITANIUM PIGMENT

Isaac Ephraim Weber and Arthur Neville Copnall Bennett, Luton, England

No Drawing. Application May 13, 1940, Serial No. 335,012. In Great Britain May 15, 1939

5 Claims. (Cl. 106—300)

It has been proposed as a step in the manufacture of composite titanium pigments to associate with titanium oxide obtained by hydrolysis from sulphate solutions and subsequently dehydrated by heating, barium carbonate in sufficient quantity to provide more than about 10 per cent. barium carbonate in the composite pigment. The preferred form of barium carbonate is a precipitated product, ground before it is mixed with the titanium pigment.

It is known that the drying of precipitated barium carbonate preparatory to grinding it is conducted at a temperature below 200° C.

The present invention improves the effect of barium carbonate in increasing the durability of titanium pigments and paints, lacquers or plastic materials containing such pigments by using a barium carbonate, preferably a precipitated product, which has been heated to a temperature exceeding 200° C. and preferably exceeding 250° C., whereby a change in the physical condition of the carbonate is produced. It is believed that this change in physical condition of the barium carbonate is mainly associated with an increase in its average particle size. The change is dependent on the temperature and duration of the heating in the sense that the lower the temperature the longer is the duration of the heating necessary for producing a given increase in the average particle size of the barium carbonate. If the barium carbonate is heated at too high a temperature sintering will occur and the product will be coarse and harsh and difficult to grind. For this reason it is preferred that the temperature should not exceed about 600° C. In the case of a barium carbonate which when heated at a temperature below 200° C. has a particle size of about $\frac{1}{2}$ to $1\mu$, heating for 8 hours at a temperature of 350° C. increases the particle size to about $1\frac{1}{4}\mu$, heating for the same time at a temperature of 400° C. increases the particle size to an average of 3 to $3\frac{1}{2}\mu$ and heating for the same time at a temperature of 450° C. increases the average particle size to about $5\mu$.

The barium carbonate may be prepared in many different ways. Thus it may be precipitated by double decomposition of a solution of barium sulphide, barium hydrate or other soluble barium salt with an alkali carbonate such as sodium carbonate or ammonium carbonate. Under certain circumstances, it is also possible to use a bicarbonate of an alkali. Improved barium carbonate manufactured by the process of U. S. application Ser. No. 313,642 filed Jan. 12, 1940, may also be used. The barium carbonate may also be manufactured by passing carbon dioxide through a solution of barium sulphide or barium hydrate. The barium carbonate may be prepared by using the above compounds in solutions of varying concentrations and at varying temperatures.

The change produced in the physical condition of the barium carbonate by the heating operation may be accelerated if the heating is conducted in the presence of a small proportion of an alkali metal or its oxide or an alkali metal salt. When the barium carbonate has been prepared by precipitation of a solution of a barium compound with an alkali carbonate the precipitated barium carbonate will generally contain adsorbed alkali carbonate and the addition of further alkali carbonate or other alkali salt will be unnecessary. A small proportion of, for instance, an alkali carbonate may, however, be added with advantage to a barium carbonate prepared from a solution of a barium compound by precipitation with carbon dioxide or ammonium carbonate before the heating operation.

The titanium dioxide pigment used may be any of the well-known grades, such at $TiO_2$, of 98–99 per cent. strength or a composite pigment containing 70 per cent. $TiO_2$ and 30 per cent. barium sulphate prepared by co-precipitation. The titanium dioxide pigment or composite pigment may be mixed with the barium carbonate in varying proportions. The larger the quantity of barium carbonate present in the mixture the better is the durability of the titanium pigments and paints. It is preferred that the mixture shall contain at least 60 to 70 per cent. of barium carbonate, although the invention is not limited to this proportion.

The following examples illustrate the improvement attained by the present invention:

Example 1

Barium carbonate was precipitated by double decomposition between barium sulphide solution and sodium carbonate and heated at about 400° C. for 2 hours. 75 parts of the barium carbonate thus prepared were mixed with 25 parts of a titanium dioxide pigment.

For the purpose of comparison, a mixed pigment was prepared in like manner, except that the precipitated barium carbonate was heated for 2 hours at 150° C. instead of at 400° C.

Paints were prepared by adding each pigment to a linseed oil-stand oil medium (medium A) composed of:

| | Parts |
|---|---|
| Stand oil | 60 |
| Acid refined linseed oil | 20 |
| White spirit | 18 |
| Cobalt linoleate drier | 2 | in the proportion of 250 parts of pigment to 150 parts of medium A. The paints were painted on boards in the manner usually adopted for exposure tests and the boards were exposed at an angle of 45° south in an open space. After a period of 12 months the paintings containing barium carbonate which had been heated at 150° C. showed signs of chalking whereas those containing barium carbonate heated at 400° C. showed no signs of chalking. The boards showed no flaking, cracking, checking or mould growth.

*Example 2*

A composite pigment containing 25 parts of titanium dioxide and 11 parts of barium sulphate was mixed with 64 parts of barium carbonate made by double decomposition of barium sulphide solution and sodium carbonate and heated at about 400° C. for 2 hours. 150 parts of this pigment mixture were incorporated in 100 parts of a simple varnish medium of the following composition (medium B):

| | Parts |
|---|---|
| Ester Congo | 23.3 |
| Stand oil | 66.7 |
| Turpentine | 10 |
| White spirit | 20 |
| Cobalt linoleate drier | 1 |

A similar titanium dioxide pigment mixture in which the barium carbonate had been made in the same way and heated at 150° C. for 2 hours was also added to medium B in the same proportion. The enamels were painted on boards in the manner usually adopted for exposure tests and the boards were exposed at an angle of 45° south in an open space. After a period of 2 years, the enamel films containing barium carbonate which had been heated at 150° C. showed more chalking than those containing barium carbonate heated at 400° C. After 2 years the enamel films were in very good condition.

*Example 3*

Barium carbonate was made by passing carbon dioxide through a barium sulphide solution. To the barium carbonate was added 0.2 per cent. of sodium carbonate calculated on the dry barium carbonate content. One portion of the barium carbonate was then heated at 150° C. and the other portion at 400° C., in each case for 2 hours. Each portion was then mixed with titanium dioxide to produce mixed pigments containing 25 per cent. of TiO₂ and 75 per cent. of the barium carbonate and paints were prepared by adding each pigment to medium A in the proportion of 250 parts of pigment to 150 parts of medium A. Exposure tests similar to those described in Examples 1 and 2 showed that the paint containing the barium carbonate heated at 400° C. had an improved durability to weathering as compared with the paint containing the barium carbonate heated at the lower temperature.

It is to be understood that in the appended claims the term "titanium dioxide pigment" includes pigments consisting only or substantially only of titanium dioxide as well as pigments consisting of titanium dioxide in association with an extender, such as barium sulphate.

We claim:

1. A process for the production of composite titanium pigments which comprises incorporating in a titanium dioxide pigment a precipitated barium carbonate which has been heated at a temperature exceeding 200° C. but below that at which it would become sintered.

2. A process for the production of composite titanium pigments which comprises incorporating in a titanium dioxide pigment a precipitated barium carbonate which has been heated at a temperature exceeding 200° C. but below that at which it would become sintered and has an average particle size of $3\mu$–$5\mu$.

3. A process for the production of composite titanium pigments which comprises incorporating in a titanium dioxide pigment a precipitated barium carbonate which has been heated at a temperature within the range 250–600° C.

4. A process for the production of composite titanium pigments which comprises incorporating in a titanium dioxide pigment a precipitated barium carbonate which has been heated at a temperature within the range 250–600° C. and has an average particle size of $3\mu$–$5\mu$.

5. A process for the production of composite titanium pigments which comprises incorporating in a titanium dioxide pigment a barium carbonate which has been precipitated from a solution of a soluble barium compound by means of an alkali metal carbonate and been heated at a temperature within the range 250–600° C. and has an average particle size of $3\mu$–$5\mu$.

ISAAC EPHRAIM WEBER.
ARTHUR NEVILLE COPNALL BENNETT.